United States Patent [19]
Nakatsuka

[11] 4,147,364
[45] Apr. 3, 1979

[54] NON-VIBRATION TONE ARM
[75] Inventor: Hisayoshi Nakatsuka, Mitaka, Japan
[73] Assignee: Namiki Precision Jewel Co., Ltd., Tokyo, Japan
[21] Appl. No.: 859,536
[22] Filed: Dec. 12, 1977
[30] Foreign Application Priority Data
  Mar. 30, 1978 [JP] Japan .................. 52-35620
[51] Int. Cl.² .............................. G11B 3/10
[52] U.S. Cl. ...................... 274/1 R; 274/23 R
[58] Field of Search ........... 274/23 R, 23 A, 1 R; 181/206, 207, 208

[56] References Cited
U.S. PATENT DOCUMENTS
2,542,534  2/1951  John ........................ 274/23 R FOREIGN PATENT DOCUMENTS
534673  9/1931  Fed. Rep. of Germany ...... 274/1 R
2238747  2/1974  Fed. Rep. of Germany ...... 52/144
330182  10/1935  Italy ........................ 138/115
4341 of  1819  United Kingdom ............. 138/115
131434  8/1819  United Kingdom ............. 181/206

Primary Examiner—Harry N. Haroian
Attorney, Agent, or Firm—Gerald J. Ferguson, Jr.; Joseph J. Baker

[57] ABSTRACT

A tone arm adapted to be disposed between a head shell and a holder for the tone arm, the tone arm comprising at least one hollow member contacting the head shell or the tone arm support and having an orientation axis extending through the hollow portion of the hollow member where the angle $\theta$ between the orientation axis and an arm shaft axis extending between the head shell and the tone arm holder is greater than 0° whereby a mechanical vibration introduced into the tone arm from a vibration source comprising either the head shell or the tone arm holder is divided between two paths both of which start at the contact point between the hollow member and the vibration source and then pass around the respective sides of the hollow member to a cancellation point where the vibrations in the two paths substantially cancel one another due to difference in their direction of travel.

10 Claims, 7 Drawing Figures

NON-VIBRATION TONE ARM

BACKGROUND OF THE INVENTION

FIG. 1 is a diagrammatic, side view of an illustrative, conventional tone arm structure during playback. In the FIG. 1 is an arm shaft, 2 is a head shell, 3 is a weight and 4 is an arm shaft holder. The material used in arm shaft 1 ought to be physically strong and of light weight. Generally, metal pipe is used. In addition, sheet like arm shafts may be used whose cross-sections are three sided squares. However, the following problems arise in these conventional arm shafts due to the connection from head shell 2 to arm shaft holder 4 and weight 3.

In FIG. 1, a pick up cartridge 5 and its associated needle (which is supported by a cantilever 7) reproduces an audio signal recorded on a record 6. Cartridge 5 is supported by head shell 2. However, lateral wave shape vibration develops in cantilever 7 at this time and longitudinal wave vibration develops at the support of the cantilever. The cause of the foregoing seems to be a longitudinal wave vibration in the direction of damper operation since the damper which statically supports the cantilever and which dampens its vibration resists the lateral wave vibration of the cantilever. The longitudinal wave vibration indicated at 8 is the origin of the oscillation of the generator supported within cartridge 5. It is then conveyed to head shell 2 and to arm shaft 1 where vibration is set up. This is then transmitted to arm shaft holder 4 and weight 3. Parts of the foregoing elements return the vibration to cartridge 5 as a catoptric wave 8' and the generator vibration is repeated. This deteriorates the electrical output signals of cartridge 5 and results in inter-modulation distortion and noise. Thus, the reproduction tone quality is seriously undermined.

Recent counter-measures include tone arm structures which prevent mechanical connection through proper elastic support of the tone arm by head shells and weights which resist vibration and through improvement of the vibration resistant qualities of the generator circuit within the cartridge. Also note Japanese Patent Applications No. 51-23701 entitled "Pick-Up Tonearm" and No. 51-24246 entitled "No-resonance Head-Shell".

However, in the physically important arm shaft 1 which constitutes more than sixty percent of the effective length of the tone arm structure in a conventional record player, there is virtually no mechanical internal loss in propagation of longitudinal wave vibration 8 lengthwise in the arm shaft 1 since, as indicated above, the length involves a smooth connection from the head shell 2 to the arm shaft holder 4. Accordingly, in a conventional arm shaft 1, there is no attenuation in propagation of longitudinal wave vibration 8 in the arm shaft and this vibration easily travels back and forth. Thus, a negative effect on the pick up structure is unavoidable.

SUMMARY OF THE INVENTION

A primary objective of this invention is the provision of an improved arm shaft structure whose objective is the attenuation and elimination of longitudinal wave vibration propagation in the arm shaft.

Other objects and advantages of this invention will be apparent from a reading of the following specification and claims taken with the drawing.

DETAILED DESCRIPTION OF PREFERRED EMBODIMENTS

Figure 1:
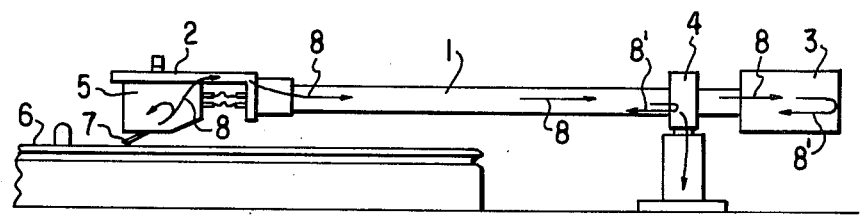
FIG. 1 is a diagrammatic, side view of an illustrative, conventional tone arm during playback.
Figure 2:
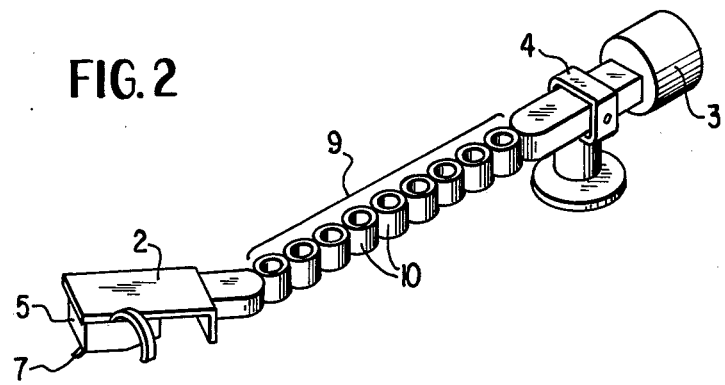
FIG. 2 is a perspective view of an illustrative, non-vibration inducing tone arm in accordance with the present invention.

Like reference numerals refer to like parts in the drawing. Referring to FIG. 2, an arm shaft 9 comprises arm elements or hollow members 10 which are linked in the lengthwise direction. Arm elements 10 may be sections of thin pipe of arbitrary length. They preferably are arranged so that the direction of the center axis of each element 10 directly intersects the lengthwise direction of arm shaft 9. The number of elements may be any arbitrary number within the range of the effective length of the tone arm. The output lead line of cartridge 5 is led to arm shaft holder 4 through small holes which penetrate the connected pipes.

Figure 3:
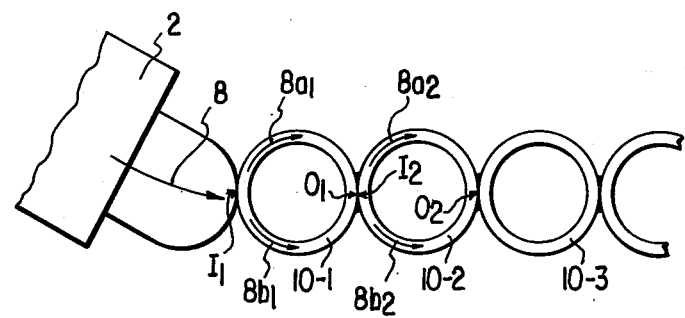
FIG. 3 is a plan view illustrating the process of longitudinal wave vibration reduction in FIG. 2.

FIG. 3 illustrates a typical path of longitudinal wave vibration 8 which is transmitted through arm elements 10 when the longitudinal wave vibration is conveyed from head shell 2 to arm shaft 9. The longitudinal wave vibration 8 from the head shell 2 diverges into two directions at the point of vibration entrance $I_1$ at a first arm element 10-1. It is then transmitted as longitudinal wave vibrations $8a1$ and $8b1$. Both vibrations merge at point $O_1$ which is directly opposite the initial entrance point of vibration at arm element 10-1. The longitudinal wave vibrations $8a1$ and $8b1$ have the same phase and level at vibration output point $O_1$ but the directions of propagation, specifically the vector directions, vary by 180°. Due to this relation, a state of mechanical short circuit develops and both vibrations are eliminated. However, since the arm element 10 has a certain width, there is vibration at the vibration output point $O_1$ with slightly different phase and level which is transmitted to the next arm element 10-2. Similarly, the vibration is divided into longitudinal wave vibrations $8a2$ and $8b2$ at the vibration input point $I_2$ of arm element 10-2 which abuts vibration output point $O_1$. Vibrations of identical phase and level are short circuited at vibration output point $O_2$ which is the point of convergence and other vibrations are transmitted to arm element 10-3. By means of this action, the vibration level is reduced and eliminated during the course of transit in arm shaft 9 which is thus composed of sections which mechanically short circuit the longitudinal wave vibration 8.

Figure 4:
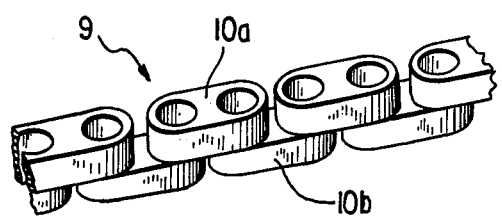
FIGS. 4, 5 and 6 are perspective views of further embodiments of illustrative, non-vibration inducing tone arms in accordance with the invention.

The actual structure of such arm shaft 9 involves consideration of the individual shapes and material for arm elements which would provide the short circuiting action. The mechanical over-all strength and weight of the arm shaft would also have to be suitable. FIG. 4 illustrates an embodiment in which cylindrical pipes are linked by first and second linking members 10a and 10b, for example, where each linking member has a pair of holes in the respective ends thereof, the holes of adjacent linking members being aligned.

Figure 5:
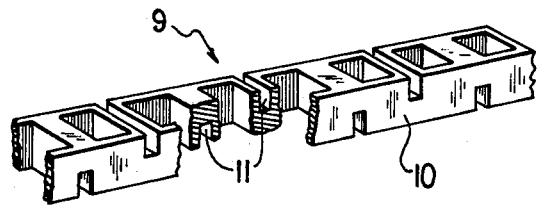

FIG. 5 illustrates an embodiment in which angular pipes are linked, the hollow portions being integrally connected together and separated by ridges 11 where adjacent ridges extend into opposite sides of the tone arm. In both of the foregoing embodiments of FIGS. 4 and 5, the short circuiting action of the sections is enhanced by alternating preferably the upper half and lower half faces of the pipe widths. In addition, the mechanical strength is also enhanced.

Figure 6:
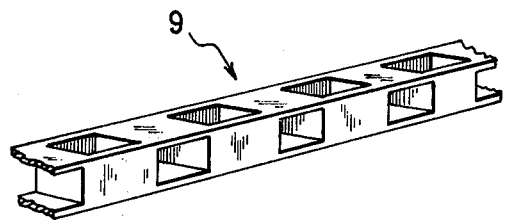

FIG. 6 is another embodiment using angular pipes where the direction of the center lines of adjacent pipes or holes are orthogonally disposed at right angles with respect to one another. The short circuit effect and mechanical intensity are both enhanced in this embodiment.

Figure 7:
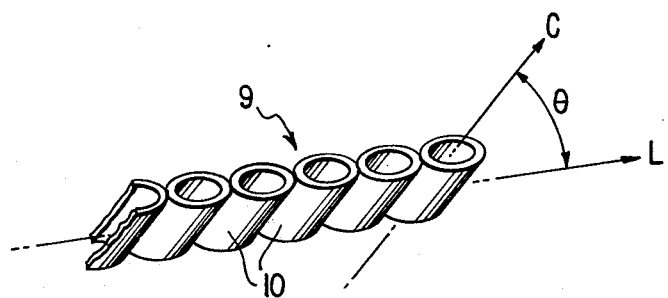
FIG. 7 is a perspective view illustrating the direction at which the arm elements can be placed.

The number of individual arm elements 10 which are used may be set at any number in accordance with the short circuiting action. As shown in FIG. 7, the orientation axes or directions in which arm elements 10 are disposed may be direction c with respect to the center axis L of the tone arm shaft 9 so long as the angle $\theta$ exceeds 0°, the center axis extending between head shell 2 and tone arm support 4. When the elements 10 are symmetrical, the axis of symmetry thereof corresponds to the orientation axis thereof.

What is claimed is:

1. A tone arm for use in a phonograph record player adapted for connection to a holder for the tone arm, comprising a head shell adapted to support a stylus cartridge, said tone arm further comprising at least two hollow members, the first one of which is connected to said head shell and the second one of which is connected at one end thereof to said first hollow member, the other end thereof being adapted for connection to said tone arm holder, each said hollow member having an orientation axis extending through the hollow portion thereof where the angle $\theta$ between said orientation axis and an arm shaft axis extending between said head shell and said tone arm holder is greater than 0° whereby a mechanical vibration introduced into said tone arm from a vibration source comprising either said head shell or said tone arm holder is divided between two paths both of which start at the connection point between (a) the hollow member connected to the vibration source and (b) the vibration source and then pass around the respective sides of the hollow member connected to the vibration source to a cancellation point where the vibrations in the two paths substantially cancel one another due to the difference in their respective directions of travel.

2. A tone arm as in claim 1 where $\theta = 90°$.

3. A tone arm as in claim 1 where said hollow member is symmetrical and said orientation axis is an axis of symmetry.

4. A tone arm as in claim 3 where said hollow member is cylindrical tube.

5. A tone arm as in claim 4 where $\theta = 90°$.

6. A tone arm as in claim 1 where the axes of orientation of said first and second hollow members are substantially orthogonal.

7. A tone arm for use in a phonograph record player adapted for connection to a holder for the tone arm, comprising a head shell adapted to support a stylus cartridge, said tone arm further comprising at least three linking members, each having first and second holes disposed at the respective ends thereof, the first linking member being connected at one end thereof to said head shell and at the other end thereof to said second linking member so that the second hole of the first linking member and first hole of the second linking member are aligned to form an opening which extends through the tone arm, the second linking member being connected at the other end thereof to said third linking member so that the second hole of the second linking member is aligned with the first hole of the third linking member to form a further opening extending through the said tone arm, said third linking member being adapted at the other end thereof for connection to said tone arm holder, each said opening having an orientation axis extending therethrough where the angle $\theta$ between said orientation axis and an arm shaft axis extending between said head shell and said tone arm holder is greater than 0° whereby a mechanical vibration introduced into said tone arm from a vibration source comprising either said head shell or said tone arm holder is divided between two paths both of which start at the connection point between (a) the opening adjacent the vibration source and (b) the vibration source and then pass around the respective sides of the opening adjacent the vibration source to a cancellation point where the vibrations in the two paths substantially cancel one another due to the difference in their respective directions of travel.

8. A tone arm as in claim 7 where the thickness of said linking members in the direction of said openings is substantially equal.

9. A tone arm for use in a phonograph record player adapted for connection to a holder for the tone arm, comprising a head shell adapted to support a stylus cartridge, said tone arm further comprising a shaft, one end of which is connected to said head shell and the other end of which is adapted for connection to said tone arm holder, said shaft having at least three openings extending in the same direction therethrough and a first ridge disposed between the first and second of said openings extending in the same direction as the openings from a first side of said shaft and a second ridge disposed between said second and third openings extending in the same direction as the openings from the side of said shaft opposite said first side, each said opening having an orientation axis extending therethrough where the angle $\theta$ between said orientation axis and an arm shaft axis extending between said head shell and said tone arm holder is greater than 0° whereby a mechanical vibration introduced into said tone arm from a vibration source comprising either said head shell or said tone arm holder is divided between two paths both of which start at the connection point between (a) the opening adjacent the vibration source and (b) the vibration source and then pass around the respective sides of the opening adjacent the vibration source to a cancellation point where the vibrations in the two paths substantially cancel one another due to the difference in their respective directions of travel.

10. A tone arm as in claim 9 where said ridges extend into said shaft about one-half the thickness of said shaft.

* * * * *